United States Patent Office 3,079,244
Patented Feb. 26, 1963

3,079,244
HERBICIDAL METHOD
Otto Scherer and Paul Heller, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 6, 1960, Ser. No. 41,001
6 Claims. (Cl. 71—2.6)

The present application is a continuation-in-part of our copending application Ser. No. 664,916, filed June 11, 1957, now U.S. Patent 2,960,534, granted November 15, 1960.

The present invention provides a herbicidal composition and a method for the destruction of plants and for the inhibition of undesired plant growth.

It is already known to use substituted ureas, for example, N-(4-chlorophenyl)-N',N'-dimethyl-urea (CMU) for combating weeds.

Now, we have found that chlorophenyl methoxy ureas of the following formula are suitable for the destruction of plants and for the inhibition of undesired plant growth. Owing to their more rapid onset of action they are superior to the known urea derivatives. Accordingly this invention is directed to herbicidal formulations and to processes for killing weeds which employ at least one chlorophenyl methoxy urea of the formula:

(1) 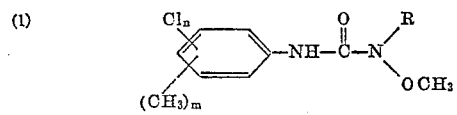

in which R stands for a member of the group consisting of H and $CH_3$, $m$ stands for an integer from 0 to 1, and $n$ stands for an integer from 1 to 3.

Typical of compounds which can be used in compositions and processes of the invention are the following:

(2) N-(4-chlorophenyl)-N'-methyl-N'-methoxy-urea

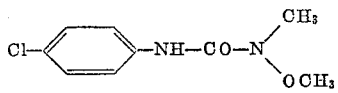

(3) N - (3,4-dichlorophenyl) - N'-methyl - N'-methoxy urea.
(4) N-(2,4,5-trichlorophenyl) - N'-methyl-N'-methoxy urea.
(5) N-(4-chlorophenyl)-N'-methoxy urea.
(6) N - (2,4-dichlorophenyl) - N'-methyl - N'-methoxy urea.
(7) N-(2-chlorophenyl)-N'-methyl-N'-methoxy urea.
(8) N-(3-chlorophenyl)-N'-methyl-N'-methoxy urea.
(9) N-(2-methyl-4-chlorophenyl)-N'-methyl-N'-methoxy urea.
(10) N-(2,3,4-trichlorophenyl)-N'-methyl-N'-methoxy urea.

These compounds may be prepared by reacting isocyanates with O-methyl-hydroxyl amines according to the following scheme, wherein R, $m$ and $n$ have the meaning indicated above

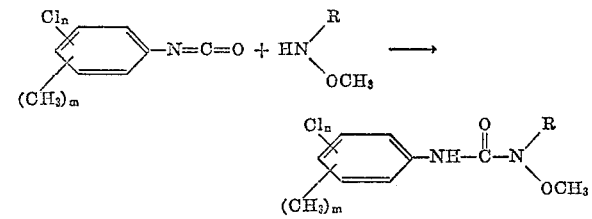

A parachlorophenyl methoxy urea as described can be used for the destruction of undesired plants by applying the compound to the area to be protected. Thus one or more of the compounds can be applied in a suitable formulation to the soil or to the plants which it is wished to kill. The chlorophenyl methoxy ureas can be used with particular advantage in killing undesired plants, that is weeds, in crop plants. Thus the compounds can be used in pre-emergence treatment to control weeds growing in carrots, corn, soybeans, green beans, and in all types of beans. Among the weeds controlled are crab grass, foxtail grasses, water grass, Johnson grass seedlings, purslane, pigweed, cockle burr, velvet leaf, annual morning glory, lamb's quarters, and rag weed.

The parachlorophenyl methoxy urea formulations of the invention are particularly valuable for the post-emergence treatment of crop plants. Thus suitable formulations can be applied as directed sprays which avoid the growing plants as much as is practical to control the above weeds in such crops as corn, crucifers, celery, soybeans, tomatoes, peppers, okra, eggplants, and pole beans.

The rate of application will depend somewhat upon soil types, the plants and weeds being treated, and other factors which are well-understood, but in general will probably be from about ½ to 5 pounds per acre, based upon the weight of parachlorophenoxymethyl ureas in the composition applied. Smaller amounts from, say, ¼ pound per acre can be used to exert a desired herbicidal effect under some circumstances and as much as 8 pounds per acre, or even more, can sometimes be used without undue injury. The upper limit of course is that at which there is objectionable damage to desired crop plants and the lower limit is that at which there is no satisfactory control of unwanted plants. When the parachlorophenylmethoxy urea compounds of the invention are used to kill weeds in the absence of valuable plants then far larger amounts can be used up to 40 or 80 or even more pounds per acre.

Herbicidal compositions of the invention can be prepared by mixing one or more of the chlorophenyl methoxy ureas as above described with conventional formulating agents. It is preferred, however, that they be formulated in compositions which contain a free-flowing, inert powder and a surfactant. Still more preferred are such mixtures in which both an inert powder and one or more surfactants are present.

The free-flowing, inert powders can be any of the extenders commonly employed in the insecticide, herbicide and fungicide art for the application of such materials and may include natural clays such as attapulgite and kaolinite clays, diatomaceous earth, talcs, synthetic mineral fillers derived from silica and silicate such as synthetic fine silica and synthetic calcium or magnesium silicate, wood flour and walnut shell flour.

The amount of the extenders can vary widely and can range from about 10 to 98% by weight of a herbicidal composition. Thus the amount of chlorophenyl methoxy urea will range from about 2 to 90%. The particle size can vary considerably but will ordinarily be somewhat under 50 microns in the finished formulation. As a matter of convenience, the compositions can be prepared with a pulverulent extender or with an extender with particles above the desired size and after admixture with the chlorophenyl methoxy urea the entire composition can be suitably ground so that the particle size of the extender will be small enough to give free-flowing compositions which can readily be applied. Particle size will usually run something under 50 microns in such finished products.

Formulations including powders as described can be prepared as granules or pellets in conventional ways or can be sold as pulverulent forms suitable for formulation. When the compositions are prepared as pellets or granules or pulverulent forms intended for direct application it is desirable that they be small enough so that all will pass through a 325 mesh screen and often it will be desired that the granules be small, say, 8 to 10 mesh.

Compositions as described can, in addition to the finely divided extender, contain a surfactant. The surfactant can be a wetting agent, a dispersant, a de-foamer or an emulsifying agent which will assist dispersion of the composition in the water. The surfactants or "surface-active agents" can include such anionic, cationic and non-ionic surface-active agents as have heretofore been generally employed in pest control compositions of similar type. Suitable surface-active agents are set out, for example, in Searle U.S. Patent 2,426,417, Todd U.S. Patent 2,655,447, Jones U.S. Patent 2,412,510, or Lenher U.S. Patent 2,139,276. A detailed list of such agents is set forth by J. W. McCutcheon in "Soap and Chemical Specialties," December 1957, January, February, March and April, 1958. See also McCutcheon in "Chemical Industries," November 1947, page 8011 et seq., entitled "Synthetic Detergents"; and Bulletin E–607 of the Bureau of Entomology and Plant Quarantine of the U.S. Dept. of Agriculture.

Suitable surfactants for use in compositions of the present invention are alkyl and alkyl aryl polyether alcohols, polyoxyethylene sorbitol or sorbitan fatty acid esters, co-reacted with ureas, polyethylene glycol fatty esters and fatty alkylol amide condensates, alkyl aryl sulfonates, dialkyl esters of sodium sulfosuccinate, fatty acid esters of sodium isothionate, and long-chain quaternary ammonium chloride.

Preferred surface-active agents include polyvinyl alcohol, methocels, gum arabic, sodium alkyl naphthalene sulfonates, polymerized sodium or potassium salts of alkyl aryl sulfonic acids, and purified, partially desulfonated sodium lignin sulfonate.

In general, less than about 10% by weight of the surface-active agent will be used in compositions of the invention and ordinarily the amount of surface-active agent will be less than 1% by weight. Usually, in accordance with customary practices, the amount will range from about 0.5 to 2% of a surface-active agent.

While formulations containing free-flowing, finely divided extenders and with or without an added wetting agent are preferred compositions of the invention, it will be understood that the chlorophenyl methoxy ureas can be used in processes of the invention by formulation and application in various conventional manners.

In order that the invention may be better understood, reference should be had to the following illustrative examples:

EXAMPLE 1

50 grams of freshly distilled para-chlorophenyl-isocyanate

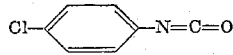

are dissolved in 100 ml. of benzene and, while shaking, admixed with a solution of 20 grams of O,N-dimethyl-hydroxylamine

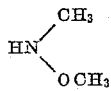

in 100 ml. of benzene. The heat produced is compensated by cooling with ice water. After standing for 24 hours at room temperature, the reaction mixture is advantageously cooled with a freezing mixture of ice and sodium chloride in order to complete the crystallisation. The compound

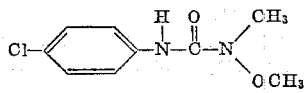

obtained in the form of crystals is then isolated by filtering with suction. After drying under reduced pressure, the colourless substance melts at 76–78° C. The yield amounts to 69 grams (98.5% of the theoretical yield).

EXAMPLE 2

A solution of 7 grams of O-methyl-hydroxylamine in 30 ml. of benzene is added to a solution of 21 grams of para-chlorophenyl-isocyanate in 60 ml. of benzene. The yield of the compound N-(para-chlorphenyl)-N'-(methoxy)-urea

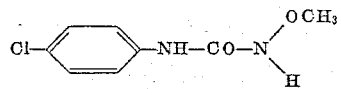

obtained in the form of crystals amounts to 26 grams=93% of the theoretical yield. Melting point: 139° C.

EXAMPLE 3

While proceeding according to the process of Example 2, there are used 10.2 grams of O,N-dimethyl-hydroxylamine in 30 ml. of benzene and 37.1 grams of 2,4,5-trichlorophenyl-isocyanate in 100 ml. of benzene. The yield of the compound N - (2,4,5 - trichlorophenyl - N'-(methoxy)-N'-(methyl)-urea

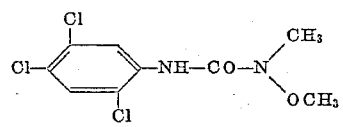

obtained in the form of crystals amounts to 34 grams=72% of the theoretical yield. Melting point: 92–93° C.

EXAMPLE 4

While proceeding according to Example 2, there are used 10.2 grams of O,N-dimethyl-hydroxylamine in 30 ml. of benzene and 31.3 grams of 3,4-dichlorophenyl-isocyanate in 100 ml. of benzene. The strong reaction heat is reduced by cooling with ice. The yield of the compound N-(3,4-dichlorophenyl)-N'-(methoxy)-N'-(methyl)-urea

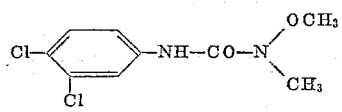

obtained in the form of crystals amounts to 32 grams=77% of the theoretical yield. Melting point: 92–93° C.

EXAMPLE 5

While proceeding according to the preceding examples, there are used 15.3 grams of O,N-dimethyl-hydroxylamine in 30 ml. of benzene and 41.7 grams of 2-methyl-4-chlorophenyl-isocyanate in 100 ml. of benzene. The strong reaction heat is reduced by cooling with ice. After evaporation of the solvent the yield of the compound N-(4 - chloro-2-methyl-phenyl)-N'-(methoxy)-N'-(methyl)-urea

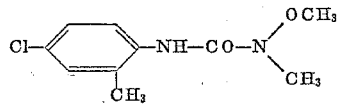

obtained in the form of crystals amounts to 40 grams=70% of the theoretical yield. Melting point: 66–67° C.

EXAMPLE 6

While proceeding according to the preceding examples there are used 15.3 grams of O,N-dimethyl-hydroxylamine and 38.4 grams of meta-chlorophenyl-isocyanate. The strong reaction heat is reduced by cooling with ice. The mixture solidifies. The yield of the compound N-(3-chlorophenyl)-N'-(methoxy)-N'-(methyl)-urea

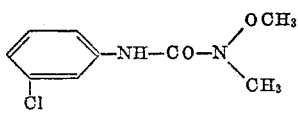

obtained in the form of crystals amounts to about 70% of the theoretical yield. Melting point: 83–84° C.

EXAMPLE 7

When using O,N-dimethyl-hydroxylamine and 2,4-dichlorophenyl-isocyanate in accordance with the process of Examples 1–6, there is obtained the N-(2,4-dichlorophenyl)-N'-(methoxy)-N'-(methyl)-urea

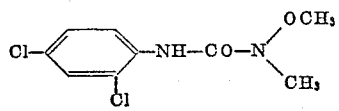

in a yield of 70%. Melting point: 44–46° C.

EXAMPLE 8

When proceeding in accordance with the preceding examples and when using O,N-dimethyl-hydroxylamine and 2-chlorophenyl-isocyanate, there is obtained the N-(2-chlorophenyl)-N'-(methoxy)-N'-(methyl)-urea

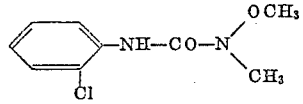

in a yield of 90% of the theoretical yield. The compound is liquid.

EXAMPLE 9

N - (4 - chlorophenyl) - N'-methoxy-N'-methyl-urea (=A) shows a considerably quicker and stronger initial action than N - (4 - chlorophenyl)-N',N'-dimethyl-urea (=CMU), that is to say the active substance is more rapidly taken up and passed on by the plants so that the latter decay in a shorter time. As example three tests carried out in greenhouses with different types of plants are set forth taken from a greater number of similar tests. In order to elucidate the technique of the experiments it must be stated:

The plants were grown in standard soil contained in paraffined paperboard pots having a capacity of 400 cc. The standard soil consisted of a mixture of 50 parts of clay earth, 25 parts of sieved compost earth and 25 parts of fine sand. The number of plants per pot amounted to: Charlock, 20 plants.

All tests were repeated 4 times and the dosage was adjusted in such a manner that per m.² 80 cc. of the spraying liquid were uniformly distributed which corresponds to a normal quantity of spraying liquid of 800 litres/hectare. Both active substances were present in the form of spraying powder which had the following composition:

(1)

80.0% of N - (4-chlorophenyl)-N'-methoxy-N'-methyl-urea (=A)
10.0% of cell pitch (lignin sodium sulfonate)
2.0% of oleyl-methyl-tauride, sodium salt
8.0% of active $SiO_2$ (2)

80.0% of N - (4 - chlorophenyl)-N',N'-dimethyl-urea (=CMU)
10.0% of cell pitch (lignin sodium sulfonate)
2.0% of oleyl-methyl-tauride, sodium salt
8.0% of active $SiO_2$ The concentrations applied which are indicated in the tables refer always to the finished product containing 80% of active substance. After the days mentioned for each case in the tables the result was determined according to the usual scheme of observation ranging from 0 to 10 (0=not injured and 10=completely destroyed).

*Greenhouse Test*

Test plant: Charlock (*Sinapis arvensis*)
Date of application: April 24, 1957
State of development of the plant: 4 leaves, 7 cm. high
For each concentration applied: 4 repetitions
The data indicated in the table according to the usual observation scheme are average values of 4 repetitions each. Spraying liquid per m.²=80 cc. of spray.

TABLE I

| Active substance, g./m.² | Result acc. to the observation scheme from 0–10 after days— | | | Preparation |
|---|---|---|---|---|
| | 4 | 9 | 14 | |
| 0.288 | 9 | 10 | 10 | A |
| | 6 | 9–10 | 10 | CMU |
| 0.192 | 9 | 9–10 | 10 | A |
| | 3 | 9–10 | 10 | CMU |
| 0.096 | 5 | 9–10 | 10 | A |
| | 3 | 9 | 10 | CMU |
| 0.048 | 3 | 9–10 | 10 | A |
| | 0 | 8 | 10 | CMU |
| | 0 | 0 | 0 | Control test, untreated plants. |

A=N-(4-chlorophenyl)-N'-methoxy-N'-methyl-urea.
CMU=3-(4-chlorophenyl)-N'-dimethyl-urea.

EXAMPLE 10

Under the conditions set forth in Example 1 the following tests were carried out on *Avena sativa*:

*Greenhouse test*

Test plant: Oats (*Avena sativa*)
Date of application: October 15, 1957
State of development of the plant: 3 leaves, 16 cm. high
For each concentration applied: 4 repetitions
The data indicated in the table according to the usual observation scheme are average values of 4 repetitions each. Spraying liquid per m.²=80 cc.=800 liters/hectare.

TABLE 2

| Active substance, g./m.² | Result acc. to the observation scheme from 0–10 after days— | | | | Preparation |
|---|---|---|---|---|---|
| | 3 4 | 6 | 9 10 | 14 5 | |
| 1.280 | 6.5 | 8 | 9.5 | 10 | A |
| 1.280 | 0 | 6 | 8 | 9 | CMU |
| 0.640 | 4 | 8 | 9.5 | 10 | A |
| | 0 | 6 | 8 | 9 | CMU |
| 0.320 | 3 | 7 | 9 | 10 | A |
| | 0 | 6 | 8 | 9 | CMU |
| 0.160 | 0 | 6 | 8 | 9 | A |
| | 0 | 4 | 7 | 8 | CMU |
| 0.080 | 0 | 6 | 7 | 9 | A |
| | 0 | 3 | 6 | 7 | CMU |
| 0.040 | 0 | 6 | 6 | 7 | A |
| | 0 | 1 | 4 | 6 | CMU |
| | 0 | 0 | 0 | 0 | Control test untreated plants. |

A=N chlorophenyl)-N'-methoxy-N'-methyl-urea.
CMU= (4-chlorophenyl)-N'-dimethyl-urea.

As apparent from the tables the compound A shows a considerably more rapid onset of action than the compound CMU.

EXAMPLE 11

Bush beans (*Phaseolus vulgaris*) of the type "Saxa o.F" were treated three days after sowing with 2.0, 1.5 and 1.0 kg./ha. of a spraying powder containing 80% of N-(3-chlorophenyl)N'-methoxy-N'-methyl-urea (=E)

as active substance and 20% of an inert carrier in the form of a wetting and dispersing agent. The treatment was repeated four times. The preparation was applied with 400 liters of water by hectare so that the portion of active substance applied by hectare amounted to 1.5, 1.2 and 0.8 kilograms.

As comparison agent there was applied in the same manner a commercial CMU-preparation with 80% of N-(3-chlorophenyl)-N',N'-dimethyl-urea.

The action of the compounds on weeds and on cultivated plants was examined 14, 28 and 56 days after the date of treatment. The action of the compounds on weeds was ascertained in percentages (untreated controls=100). The action on cultivated plants was judged by evidence according to the usual observation scheme of 0–5, wherein 0 means no and 5 means total injuring.

As can be seen from the results contained in Table 3 the compound used according to the invention, i.e. N-(3 - chlorophenyl)-N'-methoxy-N'-methyl - urea (=E), while showing the same action on weeds which, however, sets in more rapidly, does not show an injuring action on bush beans.

The CMU-compound N-(4-chlorophenyl)-N',N'-dimethyl-urea in each case, even when applied in lowest concentration, still injures bush beans considerably so that it cannot be applied with this cultivated fruit.

TABLE 3

| Herbicide | Active substance, kg./ha. | Infestation of annual seed weeds in percent of untreated controls—Control after days— | | | Action on cultivated fruits according to evidence in figures 0–5—Control after days— | | |
|---|---|---|---|---|---|---|---|
| | | 14 | 28 | 56 | 14 | 28 | 56 |
| | | Percent | Percent | Percent | | | |
| E | 1.6 | 43.0 | 4.0 | 0.5 | 0 | 0 | 0 |
| CMU | 1.6 | 57.0 | 8.0 | 0.6 | 1 | 2 | 3–4 |
| Untreated control | | 100 | 100 | 100 | 0 | 0 | 0 |
| E | 1.2 | 58 | 10 | 1.5 | 0 | 0 | 0 |
| CMU | 1.2 | 60 | 14 | 1.2 | 0–1 | 1–2 | 3 |
| Untreated control | | 100 | 100 | 100 | 0 | 0 | 0 |
| E | 0.8 | 64 | 12 | 3.5 | 0 | 0 | 0 |
| CMU | 0.8 | 70 | 15 | 3.0 | 0 | 1 | 2 |
| Untreated control | | 100 | 100 | 100 | 0 | 0 | 0 |

E=N-(3-chlorphenyl)-N'-methoxy-N'-methyl-urea.
CMU=N-(4-chlorphenyl)-N',N'-dimethyl-urea.
Types of weeds: Sinapis arvensis, Rhaphanus rhapanustrum, Senecia vulgaris, Polygonum sp., Chenopodium album, Galinsoga parviflora.

EXAMPLE 12

Peas (*Pisum sativum*) of the type "Kleine Rheinländerin" were treated 5 days after sowing with 2.0, 1.5 and 1.0 kilograms of a spray containing 80% of N-(2,4,5-trichlorophenyl)-N'-methoxy-N'-methyl-urea (=B) and 20% of a wetting or dispersing agent in 400 liters of water per hectare. Four repetitions.

In comparison therewith a commercial CMU preparation with 80% of the compound N-(4-chlorophenyl)-N'-N'-dimethyl-urea (=CMU) was applied in the same manner in peas.

The action of both compounds on the weeds and on cultivated plants was ascertained at certain intervals. The herbicidal action and the influence on cultivated fruits were evaluated analogously to the test carried out with bush beans.

The results are contained in Table 4 wherefrom it can be seen that the compound claimed, i.e. N-(2,4,5-trichlorophenyl)-N'-methoxy-N'-methyl-urea (=B) with identical action on weeds is of considerably more selective and smoother action on culture fruits(peas) than N-(4-chlorophenyl)-N'-N'-dimethyl-urea (=CMU).

TABLE 4

| Herbicide | Active substance, kg./ha. | Infestation of annual seed weeds in percent of untreated controls—Control after days— | | | Action on cultivated fruits according to evidence in figures 0–5—Control after days— | | |
|---|---|---|---|---|---|---|---|
| | | 14 | 28 | 56 | 14 | 28 | 56 |
| | | Percent | Percent | Percent | | | |
| B | 1.6 | 38 | 2.5 | 0.5 | 0 | 0 | 0 |
| CMU | 1.6 | 47 | 3.0 | 0.2 | 0 | 1–2 | 3 |
| Untreated control | | 100 | 100 | 100 | 0 | 0 | 0 |
| B | 1.2 | 49 | 3.0 | 1.0 | 0 | 0 | 0 |
| CMU | 1.2 | 54 | 3.5 | 0.8 | 0 | 1 | 2–3 |
| Untreated control | | 100 | 100 | 100 | 0 | 0 | 0 |
| B | 0.8 | 63 | 8.5 | 3.0 | 0 | 0 | 0 |
| CMU | 0.8 | 62 | 9.0 | 2.0 | 0 | 1 | 2 |
| Untreated control | | 100 | 100 | 100 | 0 | 0 | 0 |

B=N-(2,4,5-trichlorphenyl)-N'-methoxy-N'-methyl-urea.
CMU=N-(p-chlorphenyl)-N',N'-dimethyl-urea.
Types of weeds: Rhaphanus rhaphanustrum, Sinapis arvensis, Chenopodium album, Galinsoga parviflora, Polygonum sp.

EXAMPLE 13

After sowing of peas (*Pisum sativum*) the seedbed was treated shortly before the swelling of the peas with 2.0, 1.5 and 1.0 kilograms in 400 liters of water/hectare of a spray containing 80% of the compound N-(4-chloro-2-methylphenyl)-N'-methoxy - N' - methyl-urea (=C) and 20% of an inert wetting and dispersing agent.

In comparison therewith the known CMU commercial product containing 80% of N-(p-chlorophenyl)-N',N'-dimethyl-urea was sprayed.

Four repetitions of the test took place and the action of the compounds on weeds and cultivated plants was ascertained in certain intervals after the treatment. The action on weeds, analogously to the test with peas (*Pisum sativum*) was ascertained in percentages of the untreated control, the action on cultivated plants was ascertained according to evidence and expressed by figures 0–5. (Table 5, see next page.)

As results from Table 5 the compound N-(4-chloro-2-methyl-phenyl)-N'-methoxy - N' - methyl-urea (=C) in comparison with the compound of the type of N-(p-chlorophenyl)-N',N'-dimethyl-urea (=CMU) practically does not influence cultivated fruits even when applied in highest dose but shows an excellent action on annual dicotyle seed weeds.

The compound N-(p-chlorophenyl)-N',N'-dimethyl-urea (=CMU) although showing a somewhat increased action on weeds, injures the cultivated fruits so considerably, even when applied in the lowest dose, that it is of no practical use.

TABLE 5

| Herbicide | Active substance, kg./ha. | Infestation of annual seed weeds referred to untreated controls—Control after days— | | | Action on cultivated fruits according to evidence in figures 0–5—Control after days— | | |
|---|---|---|---|---|---|---|---|
| | | 14 | 28 | 56 | 14 | 28 | 56 |
| | | Percent | Percent | Percent | | | |
| C | 1.6 | 67 | 14.5 | 3.0 | 0 | 0 | 0 |
| CMU | 1.6 | 54 | 9.0 | 1.0 | 1 | 2–3 | 3–4 |
| Untreated control | | 100 | 100 | 100 | 0 | 0 | 0 |
| C | 1.2 | 70 | 16.3 | 3.8 | 0 | 0 | 0 |
| CMU | 1.2 | 58 | 12.0 | 2.1 | 1 | 2 | 3 |
| Untreated control | | 100 | 100 | 100 | 0 | 0 | 0 |
| C | 0.8 | 78 | 16.5 | 5.0 | 0 | 0 | 0 |
| CMU | 0.8 | 64 | 14.5 | 3.4 | 0–1 | 1–2 | 2–3 |
| Untreated control | | 100 | 100 | 100 | 0 | 0 | 0 |

C=N-(4-chlor-2-methyl-phenyl)-N'-methoxy-N'-methyl-urea.
CMU=N-(p-chlorphenyl)-N',N'-dimethyl-urea.

EXAMPLE 14

When treating bush beans (*Phaseolus vulgaris*) directly prior to swelling with the compound obtained by the process of the invention, i.e. N-(3,4-dichloro-phenyl)-N'-methoxy-N'-methyl-urea (=D) up to an amount of 2.0 kilograms/hectare of active substance, the cultivated fruits are not injured, but the weeds are killed to a satisfactory extent as results from the field tests recorded in Table 6.

The beans had been treated each time with 2.5, 2.0 and 1.5 kilograms/hectare in 400 liters of water/hectare with a spraying powder containing 80% of the compound N-(3,4-dichlorophenyl)-N'-methoxy - N' - methyl-urea (=D) and 20% of lingninsulfonic potassium as wetting and dispersing agent .04 repetitions.

As comparison substance there was used 2.0, 1.5 and 1.0 kilograms of a commercial CMU-preparation containing 80% of the active substance N-(4-chlorophenyl)-N',N'-dimethyl-urea. The action of both compounds on weeds and on cultivated fruits was ascertained at certain intervals, i.e. 14, 28 and 56 days after treatment. The action on weeds was ascertained by percentages in comparison with untreated controls, the injuring of the culture fruits was judged according ot evidence and expressed by figures 0–5 (Table 6).

TABLE 6

| Herbicide | Active substance, kg./ha. | Infestation of annual seed weeds in percent of untreated controls—Control after days— | | | Action on cultivated fruits according to evidence in figures 0–5—Control after days— | | |
|---|---|---|---|---|---|---|---|
| | | 14 | 28 | 56 | 14 | 28 | 56 |
| | | Percent | Percent | Percent | | | |
| D | 2.0 | 40 | 2.4 | 0.5 | 0 | 0 | 0 |
| CMU | 2.0 | 36 | 1.0 | 0.2 | 1 | 2 | 2–3 |
| Untreated control | | 100 | 100 | 100 | 0 | 0 | 0 |
| D | 1.6 | 53 | 6.5 | 1.3 | 0 | 0 | 0 |
| CMU | 1.6 | 58 | 8.0 | 2.0 | 1 | 1–2 | 2–3 |
| Untreated control | | 100 | 100 | 100 | 0 | 0 | 0 |
| D | 1.2 | 63 | 9.5 | 4.2 | 0 | 0 | 0 |
| CMU | 1.2 | 59 | 8.4 | 3.0 | 0–1 | 1 | 2 |
| Untreated control | | 100 | 100 | 100 | 0 | 0 | 0 |

CMU=N-(4-chlorphenyl)-N',N'-dimethyl-urea.
D=N-(3,4-dichlorphenyl)-N'-methoxy-N'-methyl-urea.

As results from Table 6, the compound N-(3,4-dichlorophenyl)-N'-methoxy-N'-methyl-urea (=D) while showing an excellent action on weeds does not injure the bush beans. Therefore, this compound can be used with high success for the selective combatting of weeds in bush beans.

The CMU compound N-(4-chlorophenyl)-N',N'-dimethyl-urea used as comparison substance, however, injures the culture fruits so intensely that its application in bush beans, in spite of the good action on weeds, is self-prohibiting.

We claim:
1. A method for the destruction of undesired plants which comprises applying to the area to be protected, in an amount to exert a herbicidal action, a compound of the general formula:

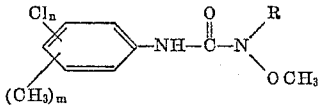

in which R stands for a member of the group consisting of H and CH₃, *m* stands for an integer from 0 to 1, and *n* stands for an integer from 1 to 3.

2. A method as claimed in claim 1 wherein the compound exerting the herbicidal action is the compound of the formula

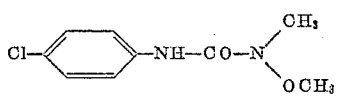

3. A method as claimed in claim 1 wherein the compound exerting the herbicidal action is the compound of the formula

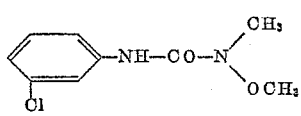

4. A method as claimed in claim 1 wherein the compound exerting the herbicidal action is the compound of the formula

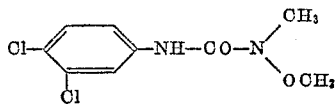

5. A method as claimed in claim 1 wherein the compound exerting the herbicidal action is the compound of the formula

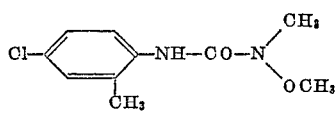

6. A method as claimed in claim 1 wherein the compound exerting the herbicidal action is the compound of the formula

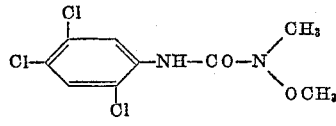

References Cited in the file of this patent
UNITED STATES PATENTS

| 2,655,447 | Todd | Oct. 13, 1953 |
| 2,876,088 | Hill et al. | Mar. 3, 1959 |
| 2,960,534 | Scherer et al. | Nov. 15, 1960 |

OTHER REFERENCES

Jones et al.: "J. Am. Chem. Soc.," vol. 49, 1927, page 1538.

UNITED STATES PATENT OFFICE
CERTIFICATE OF CORRECTION

Patent No. 3,079,244

February 26, 1963

Otto Scherer et al.

It is hereby certified that error appears in the above numbered patent requiring correction and that the said Letters Patent should read as corrected below.

Column 6, line 34, for "Example 1" read -- Example 9 --; same column, TABLE 2, the sub-headings to columns 2, 3, 4 and 5 should appear as shown below instead of as in the patent:

| 3-4 | 6 | 9-10 | 14-15 |

Signed and sealed this 19th day of May 1964.

(SEAL)
Attest:
ERNEST W. SWIDER

Attesting Officer

EDWARD J. BRENNER
Commissioner of Patents